United States Patent [19]
Tadokoro et al.

[11] 4,069,073
[45] Jan. 17, 1978

[54] PROCESS FOR THE PRODUCTION OF A FERROMAGNETIC METAL POWDER

[75] Inventors: Eiichi Tadokoro; Masashi Aonuma; Yasuo Tamai, all of Odawara, Japan

[73] Assignee: Fuji Photo Film Co., Ltd., Japan

[21] Appl. No.: 619,004

[22] Filed: Oct. 2, 1975

[30] Foreign Application Priority Data

Oct. 11, 1974  Japan .................... 49-116169

[51] Int. Cl.² .......................... H01F 1/02; H01F 1/06
[52] U.S. Cl. ................................ 148/105; 75/.5 AA; 252/62.55; 252/62.56
[58] Field of Search .......... 75/.5 AA; 148/105, 31.55; 252/62.55, 62.56, 62.58

[56] References Cited

U.S. PATENT DOCUMENTS

| 3,607,218 | 9/1971 | Akashi et al. | 148/105 |
| 3,661,556 | 5/1972 | Jolley et al. | 75/.5 AA |
| 3,669,643 | 6/1972 | Bagley et al. | 75/.5 AA |
| 3,756,866 | 9/1973 | Parker et al. | 75/.5 AA |
| 3,925,114 | 12/1975 | Takahashi et al. | 148/105 |

Primary Examiner—Walter R. Satterfield
Attorney, Agent, or Firm—Wenderoth, Lind & Ponack

[57] ABSTRACT

A ferromagnetic metal powder obtained by a reducing reaction of wet process or dry process is brought into contact with a solution containing phosphate ion. The ferromagnetic metal powder treated in this way is favorably used for magnetic recording media, in particular, suitable for high density recording.

9 Claims, No Drawings

PROCESS FOR THE PRODUCTION OF A FERROMAGNETIC METAL POWDER

BACKGROUND OF THE INVENTION

This invention relates to a process for the production of a ferromagnetic metal powder and more particularly, it is concerned with a process for the production of a ferromagnetic metal powder for magnetic recording media, in particular, suitable for high density recording.

Examples of the ferromagnetic powder which has hitherto been used for magnetic recording media are $\gamma$-$Fe_2O_3$, Co-doped $\gamma$-$Fe_2O_3$, $Fe_3O_4$, Co-doped $Fe_3O_4$ and $CrO_2$. However, these ferromagnetic powders are not so suitable for magnetic recording of a signal of short magnetic recording, for example, less than about 10 microns. That is to say, the magnetic properties such as coercive force (Hc) and maximum remanence magnetization (Br) are not sufficient for the so-called high density recording. Of late, it has been desired to develop a ferromagnetic powder having properties suitable for high density recording. One example of such a material is a ferromagnetic metal powder.

The following are known methods for producing the ferromagnetic metal powder:

1. A method comprising heat-decomposing an organic acid salt of a metal capable of forming a ferromagnetic material, for example, oxalate and reducing with a reducing gas. This method is described in, for example, Japanese Patent Publication Nos. 11412/1961, 22230/1961, 14809/1963, 3807/1964, 8026/1965, 8027/1965, 15167/1965, 16899/1965 (U.S. Patent No. 3,186,829), 12096/1966, 14818/1966 (U.S. Patent No. 3,190,748), 24032/1967, 3221/1968, 22394/1968, 29268/1968, 4471/1969, 27942/1969, 38755/1971, 38417/1972, 41158/1972 and 29280/1972.

2. A method comprising reducing a needle-like iron oxyhydroxide or a substance containing metals other than iron as well as above oxyhydroxide or needle-like iron oxide derived from the oxyhydroxide. This method is described in, for example, Japanese Patent Publication Nos. 3862/1960, 11520/1962, 20335/1964, 20939/1964, 24833/1971, 29706/1972, 30477/1972 (U.S. Pat. No. 3,598,568), 39477/1972, Japanese Patent Application (OPI) Nos 5057/1971 and 7153/1971, Japanese Patent Publication No. 24952/1973, Japanese Patent Application (OPI) Nos. 79153/1973 and 82395/1973 and U.S. Pat. Nos. 3,607,220 and 3,702,270.

3. A method comprising evaporating a ferromagnetic metal in a low pressure inert gas. This method is described in, for example, Japanese Patent Publication Nos. 25620/1971, 4131/1972, 27718/1972, Japanese Patent Application (OPI) Nos. 25662/1973 to 25665/1973, 31166/1973, 55400/1973 and 81092/1973.

4. A method comprising heat-decomposing a metal carbonyl compound. This method is described in Japanese Patent Publication Nos. 1004/1964, 3415/1965 and 16868/1970 and U.S. Pat. Nos. 2,983,997, 3,172,776, 3,200,007 and 3,228,882.

5. A method comprising electrodepositing a ferromagnetic metal powder using a mercury cathode and then separating the metal powder from mercury. This method is described in Japanese Patent Publication Nos. 12910/1960, 3860/1961, 5513/1961, 787/1964, 15525/1964, 8123/1965, 9605/1965 (U.S. Pat. No. 3,198,717), 19661/1970 (U.S. Pat. No. 3,156,650) and U.S. Pat. No. 3,262,812.

6. A method comprising reducing a solution containing a metal salt capable of forming ferromagnetic metal powder by adding a reducing agent thereto. This method is described in, for example, Japanese Patent Publication Nos. 20520/1963, 26555/1963, 20116/1968, 9869/1970, 14934/1970, 7820/1972, 16052/1972, 41718/1972 and 4.719/1972 (U.S. Patent 3,607,218), Japanese Patent Application (OPI) Nos. 1353/1972 (U.S. Pat. No. 3,756,866), 1363/1972, 42252/1972, 42253/1972, 44194/1973, 79754/1973 and 82396/1973 and U.S. Pat. Nos. 3,206,338, 3,494,760, 3,535,104, 3,567,525 3,661,556, 3,663,318, 3,669,643, 3,672,867 and 3,726,664.

The present invention relates to a method for the after-treatment of ferromagnetic metal powders obtained by the above described reducing reactions by dry prcess (1), (2) and (3) and reducing reactions by wet process (4), (5) and (6). In particular, the method (6) is preferable wherein a metal salt capable of forming a ferromagnetic metal powder is reduced in its solution.

The ferromagnetic metal powders obtained by the above described dry process or wet process reducing reactions have the following problems:

These ferromagnetic metal powders lack magnetic stability, are particularly weak under humid conditions and, even at normal temperature, are gradually oxidized by the presence of humid conditions, and the powders consisting mainly of Fe tend to readily lose their magnetism often. In the step of after-treatment after the reducing reaction, therefore, the oxidation takes place gradually and the high Bm property, one of the excellent properties of ferromagnetic metal powders, often deteriorates.

Various studies have lately been made in order to solve this problemm. For example, it has been proposed to add non-magnetic elements to reaction baths as disclosed in U.S. Pat. Nos. 3,535,104, 3,669,643 and 3,672,867, Japanese Patent Publication Nos. 7820/1972 and 20520/1963 and Japanese Patent Application (OPI) Nos. 78896/1975 (corresponding to U.S. Patent Application Ser. No. 524,853, filed Nov. 18, 1974) and 78897/1975 (corresponding to U.S. Pat. Application Ser. No. 524,860, filed Nov. 18, 1974). Another method has been proposed comprising adding additives such as organic compounds to reaction baths as disclosed in Japanese Patent Publication Nos. 20116/1968, 14934/1970 and 41719/1972 (U.S. Pat. No. 3,607,218) and 7820/1972 and Japanese Patent Application (OPI) Nos. 42253/1972, 44194/1972, 79754/1973 and 82396/1973. Furthermore, a method for solving such a problem by heat treatment of ferromagnetic metal powders obtained by the wet process reducing reaction is reported in Japanese Patent Publication Nos. 26555/1963 and 16052/1972 and Japanese Patent Application (OPI) No. 42252/1972.

SUMMARY OF THE INVENTION

It is an object of the invention to provide a method for preventing a ferromagnetic metal powder from oxidation during the production thereof.

It is another object of the invention to provide a ferromagnetic metal powder excellent in humidity resistance.

It is a further object of the invention to provide a ferromagnetic metal powder having a high coercive force (Hc) and being stable in magnetism even after the passage of time.

It is a further object of the invention to provide a ferromagnetic metal powder having a high saturation megnetization (δs).

It is a further object of the invention to provide a ferromagnetic powder having an excellent dispersibility with binders.

It is a further object of the invention to provide a ferromagnetic metal powder having excellent properties as a magnetic recording medium for high density recording.

It is a further object of the invention to provide a magnetic powder useful for permanent magnets, magnetic cores, magnetic suspensions, etc.

These objects can be accomplished by a process for the production of an improved ferromagnetic metal powder which comprises contacting a ferromagnetic metal powder obtained by a wet process or dry process reducing reaction with a solution containing phosphate ion.

DETAILED DESCRIPTION OF THE INVENTION

In the present invention, a ferromagnetic metal powder obtained by a reducing reaction is washed with water or an organic solvent containing phosphate ion.

Sources of phosphate ion used in the present invention are alkali metals, alkaline earth metals and transition metals phosphates, hydrogen phosphates and dihydrogen phosphates, phosphoric acid, ammonium phosphate and aluminum phosphate. Useful examples of the phosphate ion source are phosphoric acid, sodium phosphate, sodium hydrogen phosphate, sodium dihydrogen phosphate, ammonium phosphate, ammonium hydrogen phosphate, aluminum hydrogen phosphate, aluminum dihydrogen phosphate, potassium phosphate, potassium hydrogen phosphate, potassium dihydrogen phosphate, ammonium sodium hydrogen phosphate, calcium dihydrogen phosphate, strontium hydrogen phosphate, manganous dihydrogen phosphate and magnesium hydrogen phosphate. These compounds can be used individually or in combination. Moreover, these phosphate ion sources are generally used in the form of a solution in at least one solvent selected from water and water-miscible organic solvents. As the organic solvent are desirable polar organic solvents being miscible completely or partly with water, such as alcohols and ketones. Useful examples of the polar organic solvent are methyl alcohol, ethyl alcohol, isopropyl alcohol, acetone, methyl ethyl ketone, dimethylformamide, dimethyl sulfoxide, tetrahydrofuran and dioxane. These organic solvents can be generally used in a proportion of 0–90% by weight, preferably 0–20% by weight to water.

The concentration of phosphate ion in the solution is preferably 0.00001 to 10 mols/l, in particular, 0.0001 to 1 mol/l, since if less than 0.00001 mol/l, the effects of the invention cannot be attained and if more than 10 mols/l, not only it is difficult to prepare the solution, but also it takes a time for washing with water after the treatment.

The treatment temperature is ordinarily $-10°$ to $+120°$ C, preferably to 10° to 80° C. The treatment time and the proportion of the powder and solvent are not particularly limited and can optionally be chosen, but the treatment is ordinarily carried out in 5 seconds to 1 hour, preferably 1 to 10 minutes and the proportion of the powder to the solvent is 1 : 1 – 50, preferably 1 : 2 – 10 by weight.

ferromagnetic feromagnetic metal powder used in the present invention may be that obtained by the dry process or wet process reducing reaction as described above, but the effects of the invention can best be given by a ferromagnetic metal powder obtained by reducing a metal salt capble of forming a ferromagnetic metal in solution.

The ferromagnetic metal powders as used in the present invention are, as described above, produced by a solution reduction process, for example, (6) a method comprising reducing a metal salt capable of forming a ferromagnetic metal powder in a solution thereof with a reducing agent.

The present invention can be particularly effectively applied to those ferromagnetic metal powders produced by method (6) in which a metal salt capable of forming a ferromagnetic metal powder is reduced in a solution thereof.

More specifically, those ferromagnetic metal powders produced by reducing a metal salt capable of forming a ferromagnetic metal powder with, as a reducing agent, an acid containing a phosphinate (hypophosphite) ion or a salt thereof; a boron hydride compound such as sodium borohydride, diethylamine borane, methyl diborane, and the like or the derivatives thereof; hydrazine and its derivatives; and metal powders such as Mg, Ca, Al, etc., etc. can be used. If a phosphinic acid ion-containing acid or a salt thereof is used as the reducing agent, phosphorus, P, is incorporated into the ferromagnetic metal powder formed in a proportion of about 0.1 to 10% by weight during the course of the reaction. In the case of the boron hydride compounds or the derivatives thereof, boron, B, is incorporated into the ferromagnetic metal powder in a proportion of about 0.1 to 10% by weight during the course of the reaction.

At least about 75% by weight or more, preferably 80% by weight or more, of this ferromagnetic metal powder is a metal. At least about 80% by weight of the metal comprises a metal which is at least one member selected from Fe, Co, and Ni, i.e., Fe, Co, Ni, Fe—Co, Fe—Ni, Co—Ni and Fe—Co—Ni as the major component. In addition to these metals, about 20% by weight or less, peferably 0.5 to 5% by weight, of one or more of Al, Si, S, Sc, Ti, V, Cr, Mn, Zn, Y, Mo, Rh, Pd, Ag, Sn, Sb, Te, Ba, Ta, W, Re, Au, Hg, Pb, Bi, La, Ce, Pr, Nd, B, P and the like are present, if necessary in order to improve the properties of the ferromagnetic metal powder. For example, where a boron hydride compound is used as the reducing agent, in a preferred example the metal comprises 80% by weight or more of the ferromagnetic metal powder, and the metal comprises about 68 to 89% by weight of iron, about 7 to 34% by weight of cobalt, and about 0.5 to 5% by weight of chromium. The remainder comprises water, hydroxides, oxides, and the like.

In accordance with the method of the present invention, a ferromagnetic metal powder, e.g., a ferromagnetic metal powder obtained by effecting oxidation-reduction reaction using sodium borohide as the reducing agent, is separated from the reaction solution, and the ferromagnetic metal powder so separated is, if the cnductivity of the reaction solution is not more than 20 m $v$/cm, immediately, or if the conductivity is not less than 20 m $v$/cm, after reducing the conductivity to not more than 20 m $v$/cm by washing the ferromagnetic metal powder with water, treated with an aqueous solution containing the anionic surface active agent, for example, sodium oleate, to adsorb the surface active agent on the surface of the ferromagnetic metal powder. In effecting the treatment, it is important to disperse the ferromagnetic metal powder uniformly in the aqueous solution. Then, any excess of the sodium oleate is removed directly or by washing with water. In carrying out the replacement, it has been found that the replacement can be carried out in a short period of time if an organic solvent is used. In this case, it is effective to incorporate a reducing agent into the organic solvent.

The thus treated ferromagnetic metal powder is, as is, dried in a non-oxidizing atmosphere such as nitrogen, an inert gas, or the like, or in vacuo, or in the atmosphere. Alternatively, the metal powder can be immersed in an organic solvent. Usually, the ferromagnetic metal is mixed with and dispersed in a binder, and the mixture is coated on a support and dried, which is used as a magnetic recording member in the form of a tape, a disc, a sheet, a card, or the like.

In accordance with an even more effective method, non-magnetic elements or organic compounds can be added to the metal salt having ferromagnetic properties and the mixture so prepared reduced to produce a ferromagnetic powder having excellent resistance to oxidation and the like, whereafter the ferromagnetic powder is treated with a solvent containing an anionic surface active agent or agents.

Examples of non-magnetic elements as are mentioned above include Cr, Ti, Ph, Mn, Pt, As, Ca, Ge, Ta, Zn and the like, these disclosed in U.S. Pat. Nos. 3,535,104, 3,661,556 and 3,672,867, Japanese Patent Publication 20520/1963, and Japanese Patent Applications (OPI) 78896/1975 (corresponding to U.S. Patent Appliction Ser. No. 524,853, filed Nov. 18, 1974) and 78897/1975 (corresponding to U.S. Patent Application Ser. No. 524,860, filed Nov. 18, 1974).

When the amount of the ferromagnetic metal ions solved in the solution is 0.002 to 2.0 mol/liter, preferably from 0.01 to 0.5 mol/liter, the non-magnetic elements can be present in an amount of 0.0 to 15.0 mol %, preferably 0.0 to 5.0 mol %, based on the ferromagnetic metal ions.

Examples of the organic compounds as are mentioned above (present in the reaction solution) are fatty acids, aryl sulfonates, surface active agents, orgaic solvents, complexing agents, viscosity increasing agents, passivating agents, proteins, carbohydrates, and the like, such as those disclosed in U.S. Pat. Nos. 3,607,218 and 3,661,556, Japanese Patent Publications 20116/1968, 14934/1970 and 7820/1972, and Japanese Patent Applications (OPI) 42253/1972 (corresponding to U.S. Pat. Nos. 3,725,036), 79754/1973 (corresponding to U.S. Patent Application Ser. No. 326,358, filed Jan. 24, 1973), 82396/1973 and 41756/1975 (corresponding to U.S. Patent Application Ser. No. 498,338, filed Aug. 19, 1974).

Fatty acids, aryl sulfonates and surface active agents can be added in an amount of about 0.05 to 1.0% by weight, preferably 0.06 to 0.7% by weight, while organic solvent(s), complexing agent(s), and passivating agent(s) can be added in an amount of about 0.1 to 50% by weight, proteins and carbohydrates can be added in an amount of about 0.5 to 10% by weight, preferably 1.0 to 6.0% by weight, and viscosity increasing agents can be added to increase the system viscosity to 2.0 cp or more, preferably 2.0 to 10.0 cp.

In accordance with the method of the present invention, a ferromagnetic metal powder is obtained which has a coercive force of about 10 to 2000 Oe or more, a $\delta_s$ value of about 80 emu/g or more (at Hm=2000 Oe), and a Br/Bm ratio of about 0.50 or more. It is possible to produce a ferromagnetic metal powder having a particle size of about 50 to 1000 Å in the direction of the minor axis, and furthermore, it is possible to produce a ferromagnetic metal power whose particles are spherical to needle like (including a needle-like shape in which 2 to 20 spherical particles are connected).

Examples of preferred compositions for the ferromagnetic alloy powder of the above components are as follows:

Fe—Co—Cr—B, Fe—Co—Ti—B, Fe—Co—Pb—B, Fe—Co—Sn—B, Fe—Co—Sb—B, Fe—Co—S—B, Fe—Ni—Cr—B, Fe—Ni—Ti—B, Fe—Ni—Pb—B, Fe—Ni—Sn—B, Fe—Ni—Sb—B, Fe—Ni—S—B, Co—Ni—Cr—P, Co—Ni—Ti—P, Co—Ni—Pb—P, Co—Ni—Sn—P, Co—Ni—Sb—P, Co—Ni—S—P, Co—Ni—Pb—P, Fe—Co—Ni—Cr—B, Fe—Co—Ni—Ti—B, Fe—Co—Ni—Pb—B, Fe—Co—Ni—Sn—B, Fe—Co—Ni—Sb—B, Fe—Co—Ni—S—B Fe—Co—Ni—Cr—P, Fe—Co—Ni—Ti—P, Fe'Co—Ni—Pb—P, Fe—Co—Ni—Sn—P, Fe—Co—Ni—Sb—P, Fe—Co—Ni—S—P, which comprise at least one component from the following groups, respectively: (Fe, Co, Ni) + (Cr, Ti, Pb, Sn, Sb, S) + (B, P).

The effect of the present invention can be increased by heating the ferromagnetic metal powder produced by the above described methods in a non-oxidizing atmosphere for from about 30 minutes to about 50 hours, or in the presence of a small amount of $H_2O$ or $O_2$, where the amount of water and/or oxygen is about 10 % by weight or less of the ferromagnetic metal powder. Such an improved method is described in, for example, Japanese Patent Publication Nos. 3862/1960, 26555/1963, 9869/1970, and 16052/1972. The present invention can be used in combination with these improved methods.

In a preferred embodiment of the invention, a ferromagnetic metal powder is prepared by the oxidation and reduction reaction in an aqueous solution using sodium borohydride as a reducing agent, separating the resulting ferromagnetic metal powder from the reaction solution, dispersing the powder in an aqueous solution containing phosphate ion followed by washing with water. The oxidation is thus prevented during the step of water washing. Instead of this water, a water-miscible organic solvent or a mixture of water and a water-miscible organic solvent can be used. Furthermore, after the powder is treated with water or a mixture of water and an organic solvent containing phosphate ion, the solution can be replaced by an organic solvent so as to remove the water from the powder and to increase the dispersibility in a binder.

The ferromagnetic metal powder treated in this way is dried as it is in an inert gas such as nitrogen, helium, neon, argon, krypton, xenon or radon gas or in the air, or immersed in an organic solvent. Then the powder is ordinarily mixed with a binder, dispersed, coated onto a support, dried and practically used as recording media in the form of a tape, disk, sheet, card, etc.

According to the process of the present invention, the following advantages are obtained:

1. The oxidation of a ferromagnetic metal powder in the step of tape making can be prevented and a high $\delta_s$ can be obtained.

2. A ferromagnetic metal powder having a good humidity resistance can be produced.

3. A ferromagnetic metal powder stable in magnetism can be produced.

4. The coercive force (Hc) of a ferromagnetic metal powder can be raised.

5. The dispersibility of a ferromagnetic metal powder in a binder can be improved.

That is to say, a ferromagnetic metal powder having a coercive force of 60–2200 Oe or more and $\delta_s$ of 95–150 emu/g can be obtained according to the present invention. Such a high $\delta_s$ is possibly due to the stabilization of the surface of powder by the treatment with a phosphate ion-containing solvent.

Furthermore, the merits or advantages of the invention can be further increased by combination with the foregoing improved processes for the production of ferromagnetic metal powders. For example, a metal salt capable of forming a ferromagnetic metal powder is mixed with a non-magnetic element or an organic compound and subjected to a reducing reaction to obtain a ferromagnetic metal powder excellent in oxidation resistance, which is then treated with a phosphate ion-containing solvent according to the present invention, thus obtaining further improved results.

Furthermore, the merits or advantages of the invention can also be increased by heating at a temperature of 40° to 250° C, preferably 60° to 150° C for 30 minutes to 72 hours, preferably 3 to 24 hours a ferromagnetic metal powder produced by the process of the invention in a non-oxidizing atmosphere i.e. inert atmosphere or in the presence of a trace quantity of water as disclosed in Japanese Patent Publication Nos. 3862/1960, 26555/1963, 9869/1970 and 16052/1972.

The ferromagnetic metal powder obtained by the above described process of the invention is dispersed in a binder, coated onto a base or support with an organic solvent, and dried to prepare a magnetic recording medium having a magnetic layer.

A method of producing the magnetic coating composition used in the present invention is described in detail in Japanese Patent Publication Nos. 186/1968, 28043/1972, 28045/1972, 28046/1972, 28048/1972, 31445/1972, U.S. Pat. Nos. 3,366,505, 3,437,510, 3,475,356, 3,499,789, 3,558,492, 3,592,687, 3,597,273, 3,634,137, 3,655,595, 3,781,210 and 3,840,400 etc. The magnetic coating compositions in these patents mainly comprises a ferromagnetic powder, a binder, and a coating solvent, and in addition, the composition can contain additives such as a dispersing agent, a lubricant, an abrasive, an antistatic agent, and the like.

Suitable binders which can be used in the present invention include hitherto known thermoplastic resins, thermosetting resins, and mixtures thereof.

Suitable thermoplastic resins are those resins which have a softening point of about 150° C or less, an average molecular weight of about 10,000 to 200,000, and a degree of polymerization of the order of about 200 to 2,000, e.g., a vinyl chloride-vinyl acetate copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl ether-acrylate copolymer, an amino resin, various synthetic rubber based thermoplastic resins, and mixtures thereof.

Suitable examples of these resins which can be used are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1973, U.S. Pat. Nos. 3,144,352, 2,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition, and the like. Of these resins, the preferred ones are those which do not soften or melt before the they thermally decomposes. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid salt copolymer and a diisocyanate prepolymer, a mixture of a polyesterpolyol and a polyisocyanate, a ureaformaldehyde resin, a mixture of a low molecular weight glycol, a high molecular weight diol, and triphenylmethane triisocyanate, a polyamine resin, and mixtures thereof, etc.

Suitable examples of these resins which can be used are described in Japanese Patent Publication Nos. 8103/1964, 19779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 2,437,510, 3,597,273, 3,781,210, 3,781,211, etc.

These binders can be used individually or in combination with each other, and other additives can be added to the binders. The weight ratio of the ferromagnetic powder to the binder is generally about 100:10 to 100:200. When the proportion of the binder is less than about 10 parts by weight, the ability of the binder to bind the fine ferromagnetic powder becomes weak, and the ferromagnetic powder tends to fall off the magnetic layer. This leads to the disadvantage that the fine ferromagnetic powder that has fallen off adheres to the magnetic head, or damages the surface of the magnetic layer. On the other hand, when the proportion of the binder is above about 200 parts by weight, the magnetic flux density of the magnetic layer is reduced because the non-magnetic property of the binder dominates the layer characteristics.

In addition to the above described binder and ferromagnetic fine powder, additives such as a dispersing agent, a lubricant, an abrasive, an antistatic agent, and the like can be used in the magnetic recording layer.

Suitable dispersing agents are fatty acids containing about 12 to 18 carbon atoms (e.g., having the formula $R_1COOH$ wherein $R_1$ is an alkyl group containing about 11 to 17 carbon atoms), e.g., caprylic acid, capric acid, lauric acid, myristic acid, palmitic acid, stearic acid, oleic acid, elaidic acid, linolic acid, linolenic acid, stearolic acid, and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally employed in a proportion of about 0.5 to 20 parts by weight per 100 parts by weight of the binder. Suitable dispersing agents are described in Japanese Patent Publication Nos. 28,369/1964, 17,945/1969 and 15,001/1973 and U.S. Pat. Nos. 3,387,993 and 3,470,021.

Suitable lubricants which can be used include silicone oils, graphite, molybdenum disulfide, tungsten disulfide, fatty acid esters produced from a monocarboxylic acid containing about 12 to 16 carbon atoms and a monovalent alcohol containing about 3 to 12 carbon atoms, fatty acid ester produced from a monocarboxylic acid containing about 17 or more carbon atoms and a monovalent alcohol, in which the total number of carbon atoms ranges from about 15 to 28, and the like. These lubricants are generally used in a proportion of about 0.2 to 20 parts by weight per 100 parts by weight of the binder. These lubricants are described in Japanese Patent Publication No. 23889.1968, Japanese Patent Application Nos. 28647/1967, 81543/1968, U.S. Pat. Nos. 3,470,021, 3,492,235, 2,497,411, 3,523,086, 3,625,760, 3,630,772, 3,634,253, 3,642,539, 3,687,725, *IBM Technical Disclosure Bulletin*, Vol. 9, No. 7, page 779 (December 1966), *ELEKTRONIK*, No. 12, page 380 (1961) West Germany, etc.

Typical abrasive agents which can be used include materials generally used, e.g., fused alumina, silicon carbide, chromium oxide, corundum, synthetic, corundum, diamond, synthetic diamond, garnet, emergy (main component: corundum and magnetite), and the like. Those abrasive agents are used which have an average particle size of about 0.05 to 5 μm, preferably about 0.1 to 2 μm. These lubricants are generally used in a proportion of from about 0.5 to 20 parts by weight per 100 parts by weight of the binder. These abrasive agents are described in Japanese Patent application No. 26749/1973, U.S. Pat. Nos. 3,007,807, 3,041,196, 3,293,066, 3,630,910, 3,687,725, British Pat. Specification No. 1,145,349, West German Patent (DT-PS) No. 853,211 and 1,001,000, etc.

Antistatic agents which can be used in the present invention, include inorganic materials such as carbon black and organic materials, for example, natural surface active agents such as saponin; nonionic surface active agents such as alkylene-oxide based, glycerin based, glycidol based surface active agents, and the like; cationic surface active agents such as heterocyclic compounds, e.g., higher alkylamines, quaternary ammonium salts, pyridine, and the like; phosphoniums, sulfoniums, and the like; anionic surface active agents containing acid groups such as carboxylic acid groups, sulfonic acid groups, phosphoric acid groups, sulfate groups, phosphate groups, and the like; amphoteric surface active agents such as sulfates or phosphates of amino acids, amino sulfonic acids, and amino alcohols, and the like; etc. A suitable amount of the inorganic material is about 5 % by weight and of the organic material is about 0.5 to 1% by weight, each based on the weight of the ferromagnetic material.

Examples of the surface active agents that can be used as antistatic agents, are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Pat. Specification Nos. 1,077,317, 1,198,450, Ryohei Oda, et al., *Kaimen Kassei Zai no Gosei to so no Oyo (Synthesis of Surface Active Agents and Their Applications)*, Maki Shoten, Tokyo (1964), A. M. Schwarts et al., *Surface Active Agents*, Interscience Publications Corp. New York (1958), J. P. Sisley et al., *Encyclopedia of Surface Active Agents, Vol.* 2, Chemical Publishing Co., New York (1964), *Kaimen Kassei Zai Binran (Handbook of Surface Active Agents)*, 6th Ed., Sangyo Tosho Co., Tokyo, December 20, 1966, etc.

These surface active agents can be used individually or in combination with each other. These surface active agents are generally used as antistatic agents; but in some cases, they are used for other purposes, for example for improving dispersibility, magnetic properties, and lubricity, or as auxiliary coating agents.

The magnetic recording layer is formed by dissolving or dispersing the above described composition in an organic solvent and then coating the resulting solution on a support.

The non-magnetic support can have a thickness of about 3 to 50 μm, preferably 10 to 40 μm. If the thickness is less than about 3 μm, the tensile strength of the support required as a magnetic recording material decreases, and the support tends to break or deform. If the thickness exceeds about 50 μm, the volume and weight of the magnetic recording material increase, and therefore, the recording density per unit volume or weight decreases. Suitable materials which can be used for producing the support are polyesters such as polyethylene terephthalate, polyethylene-2,6-naphthalate, and the like, polyolefins such as polypropylene, and the like cellulose derivatives such as cellulose triacetate, cellulose diacetate, and the like, polycarbonate, etc.

The support can be subjected to the so-called back coating of the surface opposite to that having the magnetic layer thereon, for the purpose of preventing charging, magnetic print through and so on. Suitable back coating techniques which can be used are described in, for example, U.S. Pat. Nos. 2,804,401, 3,293,066, 3,617,378, 3,062,676, 3,734,772, 3,476,596, 2,643,048, 3,803,556, 2,887,462, 2,923,642, 2,997,451, 3,007,892, 3,041,196, 3,115,420, and 3,166,688.

The magnetic recording layer can be coated on the support using coating methods such as air doctor coating, blade coating, air knife coating, squeeze coating, dip coating, reverse roll coating, transfer roll coating, gravure oating, kiss coating, cast coating, spray coating, and the like, and other methods can be also used. These methods are described in *Coating Kogaku* (*Coating Engineering*), pages 253 to 277, published by Asakura Shoten, Tokyo Mar. 20, 1971).

Typical organic solvents which can be used in the present invention include ketones, e.g., acetone, methyl ethyl ketone, methyl isobutyl ketone, cyclohexanone, and the like; alcohols, e.g., methanol, ethanol, propanol, butanol, and thelike; esters, e.g., methyl acetate, ethyl acetate, butyl acetate, ethyl lactate, glycol monoethyl ether acetate, and the like; ethers and glycol ethers, e.g., diethyl ether, glycol monoethyl ether, glycol dimethyl ether, dioxane, and the like; aromatic hydrocarbons, e.g., benzene, toluene, xylene, and the like; chlorinated hydrocarbons, e.g., methylene chloride, ethylene chloride, carbon tetrachloride, chloroform, ethylene chlorohydrin, dichlorobenzene, and the like, etc., and these solvents can be used individually or in combination with each other.

The magnetic layer coated on the support by the above method is dried after, if desired, the coating has been subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960, and 3,681,138; Japanese Patent Publications Nos. 3427/1957, 28368/1964, 23624/1965, 23625/1965; 13181/1966, 13043/1973 and 39722/1973. If required, the magnetic layer can be subjected to a surface-smoothening treatment, or cut to the desired shape, thereby to form the magnetic recording material of this invention. Suitable surface-smoothening techniques are disclosed in U.S. Pat. Nos. 2,688,567, 2,998,325, and 3,783,023, and German Patent Application (OPI) No. 2,405,222.

In the above orienting treatment for the magnetic layer, the orienting magnetic field can be either an AC or DC magnetic field with a field strength of about 500 to 2000 gauss. The drying temperature can range from about 50° to about 100° C, and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure is used in this treatment is about 25 to 500 Kg/cm, and the surface temperature of the metal roll is kept at about 35° to 150° C. The rate of treatment is about 5 to 120 meters/min. When the pressure and temperature are below the lower limits of the above-specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meters/min, the operating efficiency is low, and if the rate is above about 120 meters/min., the operation is difficult.

The present invention will be explained in detail with reference to the following examples. It will be obvious to one skilled in the art that various changes and modifications can be made in the components, ratios, operational order, and the like without departing from the spirit of the present invention. Therefore the present invention should not be construed as being limited to the following examples.

All parts, percents, ratios and the like are by weight unless otherwise indicated.

Example 1

| | |
|---|---|
| Liquor A | |
| Cobalt Sulfate | 0.2 ml/l |
| Glycolic Acid (70 % Aqueous Solution) | 40 ml/l |
| Palladium Chloride (Dissolved in HCl) | 10 mg/l |
| Liquor B | |
| Sodium Phosphinate | 0.4 mol/l |
| Liquor C | |
| Sodium Hydroxide (2 N) | 100 ml |

1000 ml of Liquor A and 1000 ml of Liquor B were mixed and warmed with slow agitation to 70° C. Liquor C at 30° C was added to the mixed solution of Liquor A and Liquor B in a magnetic field (DC) of 500 Oe and the oxidation and reduction reaction was effected. The reaction was completed in 15 minutes and the liquor became transparent to form a black ferromagnetic metal powder. This powder was separated from the mother liquor by means of a Nutsche funnel, washed with 1000 ml of an aqueous solution containing 1 g/l of disodium hydrogen phosphate, washed with acetone and then dried by means of a hot air drier at 40° C to obtain a ferromagnetic powder (Sample P-1) consisting of 93% Co, 5% Pd and 2% P. The following composition containing this powder was ball milled adequately to obtain a magnetic paint:

| | |
|---|---|
| Ferromagnetic Powder (Particles having a mean size of 300 Angstrom, five to twenty particles being chained) | 300 parts |
| polyesterpolyol (OH Number = 180) terpolymer of 1 mol of adipic acid, 1 mol of diethyleneglycol and 0.06 mol of trimethylolpropane, viscosity (75° C) : 1000 centipoise, specific gravity : 1.18, —OH group value : 130, acid value 2 | 40 parts |
| Polyisocyanate Compound Commercial Name = Desmodur L-75, manufactured by Bayer A.G., 75 wt. % of butyl acetate solution of reaction product of 1 mol of trimethylolpropane and 3 mol of 2,4-tolylenediisocyanate. | 20 parts |
| Nitrocellulose viscocity : RS ½, nitrogen content : 11.8 – 12.20, molecular weight : 30,000 | 20 parts |
| Chromium Sesquioxide ($Cr_2O_3$) (Mean Particle Diameter = 0.15 micron) | 5 parts |
| Lecithin | 3 parts |
| Methyl Ethyl Ketone | 450 parts |
| Methyl Isobutyl Ketone | 400 parts |

This paint was applied to a polyethylene terephthalate film with a thickness of 25 microns while applying a magnetic field thereto, followed by heating and drying, thus obtaining a coating with a thickness of 5 microns on dry base. A wide magnetic web obtained in this way was subjected to a supercalender treatment and slit in a width of ½ inch to thus obtain a video tape (Sample T-1). The resulting tape showed a good surface property.

Example 2

| | |
|---|---|
| Liquor M | |
| Ferrous Chloride | 0.36 mol/l |
| Cobalt Chloride | 0.04 mol/l |
| Liquor R | |
| Sodium Borohydride ($NaBH_4$) | 1.6 mol/l |

80 parts of Liquor M was charged in a non-magnetic vessel, and, while stirring the liquor slowly and applying a DC magnetic field of 1,000 oersteds, 20 parts of Liquor R was added thereto in 10 seconds and the mixture was reacted at 20° C to precipitate a ferromagnetic metal powder. This powder was separated from the mother liquor by means of a Nutsche funnel, washed with an aqueous solution containing 5 g/l of disodium hydrogen phosphate in a proportion of 100 parts of 1 part of the powder, washed with methyl alcohol to remove water and a part of the powder was then dried to obtain Sample P-2 consisting of 80% Fe, 15% Co and 5% B, while the other part was subjected to substitition by butyl acetate.

To 300 parts of this powder were added 1200 parts of butyl acetate and 15 parts of sodium oleate and the mixture was stirred for 2 hours to absorb the oleate on the surface of the powder. Then the following composition:

| Polyester Polyurethane (Molecular Weight = about thirty thousand) reaction product of polyester containing terminal —OH group (reaction product of buthanediol and adipic acid), and 2,4-diphenylmethane diisocyanate, molecular weight : about 30,000. | 25 parts |
|---|---|
| Non-drying Oil-Modified Alkyd Resin reaction product of glycerine, terephthalic acid and non-drying oil, molecular weight : about 130,000. | 30 parts |
| Silicone Oil (Dimethylpolysiloxane) | 2 parts | was added to the above described mixture, ball milled for 10 hours, and mixed with 16 parts of a polyisocyanate compound (commercial Name = Desmodur L-75 manufactured by Bayer A.G., used in Example 1), followed by dispersing with a high speed shearing force for 1 hour, thus obtaining a magnetic paint.

This paint was coated onto a polyethylene terephthalate film having a thickness of 25 microns while applying a magnetic force thereto and heated and dried to obtain a coating with a thickness of 5 microns on dry base. A wide magnetic web obtained in this way was subjected to a supercalender treatment and slit in a width of ½ inch to thus obtain a video tape (Sample T-2). The resulting tape showed a good surface property.

EXAMPLE 3

Oxalates of Fe, Co and Ba having a mean grain size of 0.5 × 0.06 micron were cracked in a nitrogen atmosphere of a firing furnace at 60° C and then reduced with a hydrogen stream to obtain a ferromagnetic metal powder. This powder was cooled to about 100° C, dipped in a solvent comprising 1 part of water containing 0.1 g/l of dipotassium hydrogen phosphate and 5 parts of ethyl alcohol and taken out therefrom. Then it was substituted by acetone and dipped in butyl acetate. A part of the so treated powder was dried to obtain Sample P-3 and the other part was subjected in an analogous manner to Example 1 to tape making to obtain a tape (Sample T-3). The composition of the magnetic metal powder consisted of 60% Fe, 35% Co and 5% Ba.

COMPARATIVE EXAMPLE 1

The procedure of Example 1 was repeated except that instead of the aqueous solution of disodium hydrogen phosphate, water was used, thus obtaining a powder (Sample P-4) and a tape (Sample T-4).

COMPARATIVE EXAMPLE 2

The procedure of Example 2 was repeated except using water and methyl alcohol instead of the water containing disodium hydrogen phosphate and the methyl alcohol, thus obtaining a powder (Sample P-5) and a tape (Sample T-5).

COMPARATIVE EXAMPLE 3

The procedure of Example 3 was repeated except using the solution containing no dipotassium hydrogen phosphate, thus obtaining a powder (Sample P-6) and a tape (Sample T-6).

The comparison results are shown in Table 1 and Table 2 as to the various properties of the powders and tapes obtained in the foregoing Examples and Comparative Examples.

Table 1

| Sample No. | Saturation Magnetization* (emu/g) | Saturation Magnetization* After 7 days At 60° C and 90 % RH (emu/g) | Demagnetization Ratio (%) |
|---|---|---|---|
| P-1 | 99 | 88 | 11.1 |
| P-2 | 112 | 94 | 16.1 |
| P-3 | 148 | 120 | 18.9 |
| P-4 | 96 | 82 | 14.6 |
| P-5 | 102 | 48 | 52.9 |
| P-6 | 151 | 92 | 39.1 |

*Measured in a magnetic field of Hm = 4,000 Oe

Table 2

| Sample No. | Hc (Oe) | Br/Bm |
|---|---|---|
| T-1 | 1820 | 0.83 |
| T-2 | 1210 | 0.83 |
| T-3 | 880 | 0.81 |
| T-4 | 1820 | 0.80 |
| T-5 | 1080 | 0.81 |
| T-6 | 810 | 0.76 |

As is evident from these results, the saturation magnetization can be raised by treating a ferromagnetic metal powder with a solvent containing phosphate ion and, moreover, the saturation magnetization after being allowed to stand at 60° C in 90% relative humidity can also be improved. In the tape using such a powder, on the other hand, the coercive force as well as the squareness ratio are increased. This is due to the fact that the dispersion of a ferromagnetic powder is improved. It will clearly be understood from these results that the ferromagnetic metal powder treated according to the present invention is suitable for high density recording.

EXAMPLE 4

The procedure of Example 2 was repeated except using Liquor M to which 0.008 mol/l of chrome alum had been added, thus obtaining a powder (80% Fe, 15% Co, 1% Cr and 4% B) and a tape. The powder had a saturation magnetization of 97 emu/g measured in a magnetic field of Hm = 2,000 Oe and a saturation magnetization after 7 days at 60° C and 90% RH of 88 emu/g. The tape had a coercive force (Hc) of 980 Oe and squareness ratio (Br/Bm) of 0.85.

EXAMPLE 5

The procedure of Example 2 was repeated except using Liquor M to which 0.008 mol/ of $SnCl_2.2H_2O$ had been added, thus obtaining a powder (80% Fe, 15% Co, 1% Sn and 4% B) and a tape. The saturation magnetization of the resulting powder was 98 emu/g measured in a magnetic field of Hm = 2,000 Oe and the saturation magnetization after being allowed to stand at 60° C in 90% RH for 7 days was 90 emu/g. The Hc of the tape was 1,020 Oe and Br/Bm was 0.84.

EXAMPLE 6

The procedure of Example 2 was repeated except using potassium dihydrogen phosphate instead of the disodium hydrogen phosphate, thus obtaining a powder and a tape. The powder showed a magnetization δs = 103.2 emu/g and, after demagnetization, δs* = 89 emu/g and the tape showed Hc = 1,100 Oe and Br/Bm = 0.83.

EXAMPLE 7

In Example 2, the treatment was carried out using a phosphate ion source shown in Table 3 instead of the disodium hydrogen phosphate:

Table 3

| Phosphate Ion Source | Powder $\delta s$ (emu/g) | After Demagnetization $\delta s^*$ (emu/g) | Tape Hc (Oe) | Tape Br/Bm |
|---|---|---|---|---|
| Sodium Hydrogen Phosphate | 102.5 | 93 | 1130 | 0.85 |
| Ammonium Phosphate | 104 | 94.1 | 1120 | 0.84 |
| Ammonium Hydrogen Phosphate | 106 | 96.2 | 1090 | 0.83 |
| Aluminum Phosphate | 103 | 96.0 | 1200 | 0.83 |
| Aluminum Hydrogen Phosphate | 103 | 98.4 | 1130 | 0.86 |
| Potassium Phosphate | 104 | 95.2 | 1090 | 0.84 |
| Strontium Hydrogen Phosphate | 110 | 86.0 | 1100 | 0.82 |

It is apparent from the results of Table 3 that the demagnetization property of $\delta s^*$ after being allowed to stand at 60° C in 90% RH for 7 days was more improved as compared with the case of washing with water in the prior art.

EXAMPLE 8

The procedure of Example 2 was repeated except using 1.5 g/l of calcium hydrogen phosphate or magnesium hydrogen phosphate in place of the 5 g/l of disodium hydrogen phosphate and the properties of the resulting alloy powders and magnetic tapes were similarly examined. The powder showed $\delta_s = 104$ emu/g and, after demagnetization, $\delta_s^* = 93.2$ emu/g. The tapes showed Hc = 1090 Oe and a squareness ratio of 0.83.

It will be understood from these results that the treatment of an alloy powder with a solution containing phosphate ion is very effective. In particular, a tape using the thus treated powder shows a high Br/Bm of 0.80 or more.

What is claimed is:

1. In a process for the production of a ferromagnetic metal powder containing at least 75% by weight of at least one metal selected from the group consisting of Fe, Co, Ni, Fe—Co, Fe—Ni, Co—Ni and Fe—Co—Ni by reducing a metal salt capable of forming the ferromagnetic metal powder with a reducing agent by a wet or dry process in the presence of a non-magnetic element or an organic compound, thus obtaining an oxidation resistant ferromagnetic metal powder, the improvement which comprises treating further the ferromagnetic metal powder separated from the reducing reaction system with a solution containing phosphate ions with a concentration of 0.00001 to 10 mols/liter at a temperature of from −10° to +120° C.

2. The process as claimed in claim 1, wherein the phosphate ion is formed from at least one source selected from the group consisting of phosphoric acid, sodium phosphate, sodium hydrogen phosphate, sodium dihydrogen phosphate, ammonium phosphate, ammonium hydrogen phosphate, aluminum hydrogen phosphate, aluminum dihydrogen phosphate, potassium phosphate, potassium hydrogen phosphate, potassium dihydrogen phosphate, ammonium sodium hydrogen phosphate, calcium dihydrogen phosphate, strontium hydrogen phosphate, manganous dihydrogen phosphate and magnesium hydrogen phosphate and mixtures thereof.

3. The process as claimed in claim 1, wherein the solution is a solution in at least one solvent selected from the group consisting of water, water-miscible organic polar solvents and mixtures thereof.

4. The process as claimed in claim 3, wherein the solvent is a mixture of the organic solvent and water in a proportion of 0 to 90% by weight of the organic solvent to water.

5. The process as claimed in claim 3, wherein the water-miscible organic polar solvents are methyl alchol, ethyl alcohol, isopropyl alcohol, acetone, methyl ethyl ketone, dimethyl sulfoxide, dimethylformamide, tetahydrofuran and dioxane.

6. The process as claimed in claim 1, wherein the reducing reaction is carried out using a reducing agent selected from the group consisting of phosphinate ion-containing acids and salts, borohydride compounds and derivatives thereof such as sodium borohydride, diethylaminoborane and methylborante, hydrazine and derivatives thereof, and metallic powders such as magnesium, calcium and aluminum powders.

7. The process as claimed in claim 1, wherein the ferromagnetic metal powder further contains 20% by weight or less of at least one metal selected from the group consisting of Al, Si, S, Sc, Ti, V, Cr, Mn, An, Y, Mo, Rh, Pd, Ag, Sn, Sb, Te, Ba, Ta, W, Re, Au, Hg, Pb, Bi, La, Ce, Pr, Nd, B, P and mixtures thereof.

8. The process as claimed in claim 1, wherein the ferromagnetic powder is subjected to an after-treatment comprising heating in an inert atmosphere or in the presence of water or oxygen.

9. A magnetic recording medium obtained by the use of the ferromagnetic metal powder produced by the process of claim 1.

* * * * *